(12) United States Patent
Gallard et al.

(10) Patent No.: US 6,504,113 B2
(45) Date of Patent: Jan. 7, 2003

(54) PNEUMATIC WEIGHING DEVICE

(75) Inventors: Paul Gallard, Tourlaville (FR); François Decool, Bayeux (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 99 days.

(21) Appl. No.: 09/779,313

(22) Filed: Feb. 8, 2001

(65) Prior Publication Data

US 2001/0025729 A1 Oct. 4, 2001

(30) Foreign Application Priority Data

Feb. 11, 2000 (FR) .............................. 00 01727

(51) Int. Cl.[7] ................................. G01G 5/08
(52) U.S. Cl. .................. 177/208; 177/254; 73/862.582; 73/862.581
(58) Field of Search ................ 177/208, 209, 177/254; 73/862.581, 862.582, 862.583

(56) References Cited

U.S. PATENT DOCUMENTS

| | | | | |
|---|---|---|---|---|
| 2,954,221 A | * | 9/1960 | Ernst | 177/208 |
| 2,998,089 A | | 8/1961 | Ernst | 177/208 |
| 3,123,165 A | * | 3/1964 | Carson, Jr. et al. | 177/208 |
| 3,147,616 A | * | 9/1964 | Rome | 73/862.582 |
| 4,306,629 A | * | 12/1981 | Powell | 177/208 |
| 4,673,048 A | * | 6/1987 | Curran | 177/208 |

FOREIGN PATENT DOCUMENTS

GB 1176826 1/1970

* cited by examiner

Primary Examiner—Randy W. Gibson
(74) Attorney, Agent, or Firm—Pearne & Gordon LLP

(57) ABSTRACT

The scales include a tray (1) placed on a base (3) and lifted by an air cushion, with no mechanical connection with the base (3). The weight of an object (21) laid on the tray (1) varies the air cushion pressure, and the measurement of this pressure by an external sensor (19) is straightforward and gives the weight of the object (21) once a law of correlation has been determined. Lateral pipes enable gas to be blown against a flange (2) of the tray (1) and thus horizontal displacements of the tray and friction to be avoided. Several vertical pipes are generally provided so as to reduce tray (1) tipping after the object (21) has been thrown off centre, the weight being then given by the sum of the measurements of each vertical pipe.

7 Claims, 2 Drawing Sheets

PNEUMATIC WEIGHING DEVICE

DESCRIPTION

A pneumatic weighing device is the subject of this invention.

Everyday weighing devices include delicate mechanisms liable to go wrong or be damaged during use or maintenance operations, which makes them unsuitable for some situations, particularly in sealed enclosures, insulated from the outside, where only rather awkward remote operator devices are able to work: and some corrosive, humid, very hot or radiation charged atmospheres may make the operating conditions even more difficult.

This is why a weighing device has been designed which is entirely devoid of mechanisms and where only the force of expansion of a compressed gas is used to supply the energy necessary for operation and to measure the weight of the object being weighed. Such a device normally requires no on-the-spot adjustment or upkeep, and it is designed to be fully resistant to jarring caused by placing the object to be weighed. Moreover, the operation starts from an actual weight (that of the tray when empty), which allows the proper operation of the apparatus to be permanently monitored. The flow of compressed gas provides cleaning, anti-corrosion protection and cooling of the apparatus.

The device is distinguished from prior pneumatic scales, which have a conventional structure but which are fitted with a pneumatic sensor to measure the displacement of a test body under the weight of the object being weighed, since the compressed gas is only used in them for measurement. They are moreover old-style scales, the pneumatic displacement sensors having now been replaced by sensors of another kind.

The gas used for weighing is here used to produce a levitation of the tray on which the object is laid by creating an air cushion without a test body; but as such a system is particularly unstable, additional arrangements must be made to ensure that the tray is kept in balance, confronting at one and the same time its lateral displacements, its rotation and any tipping movements produced by an object throwing it off centre when being placed on it, and without ever allowing friction between the tray and the fixed base of the device, which would prejudice the accuracy of measurement.

A satisfactory pneumatic weighing device according to the most general definition of the invention includes in these conditions a base on which is placed a flanged tray surrounding the base, a system for blowing gas at constant pressure finishing in pipes passing through the base, one of the pipes, used for weighing, being vertical and emerging under the tray, others of the pipes being lateral, and emerging through chambers facing the tray flange. The gas cushions thus formed between the base and the tray by the blown gas ensure its centring relative to the base. The device also includes a measurement means of a magnitude correlated (beforehand) with the weight of an object laid on the tray.

The gas pressure prevailing in the cushion located at the end of the vertical pipe balances the weight of the tray and of the object placed upon it. This pressure is an increasing function of the weight of the whole.

The pressure is easy to measure provided a pressure inlet is installed in this pipe and a pressure sensor is installed, even in a remote place. The purpose of the lateral pipes is to centre the tray relative to the base by removing any potential for friction. The stability of the tray against tipping is better if there are N vertical pipes similar to the previous ones, preferably arranged at the apex of a regular polygon of the same centre as the tray. A pressure inlet may then be installed on each vertical pipe, and the sum of the N measurements after processing the signals gives the weight of the object.

In a first approximation, this function may be presented as follows:

$$(M + m)g = nS \sum_{i=1}^{i=n} Pi, \text{ where}$$

M=Tray mass
m=Object mass
n=Number of chambers
S=Surface of a chamber
Pi=Pressure prevailing in $i^{th}$ chamber.

Precautions may also be taken against rotational movements of the tray, in the frequent situation where it is circular like the flange and the base: the base and the flange are then shaped with a vertical groove and a pin engaged in the groove, leaving two clearances in front of opposite lateral faces of the pin, and the gas blowing system also includes two lateral pipes leading respectively to clearances in opposite directions. The pin slides freely in the tray groove without contact with it. dr A Preferred embodiment of the invention will now be described using the following figures.

Figure 1:
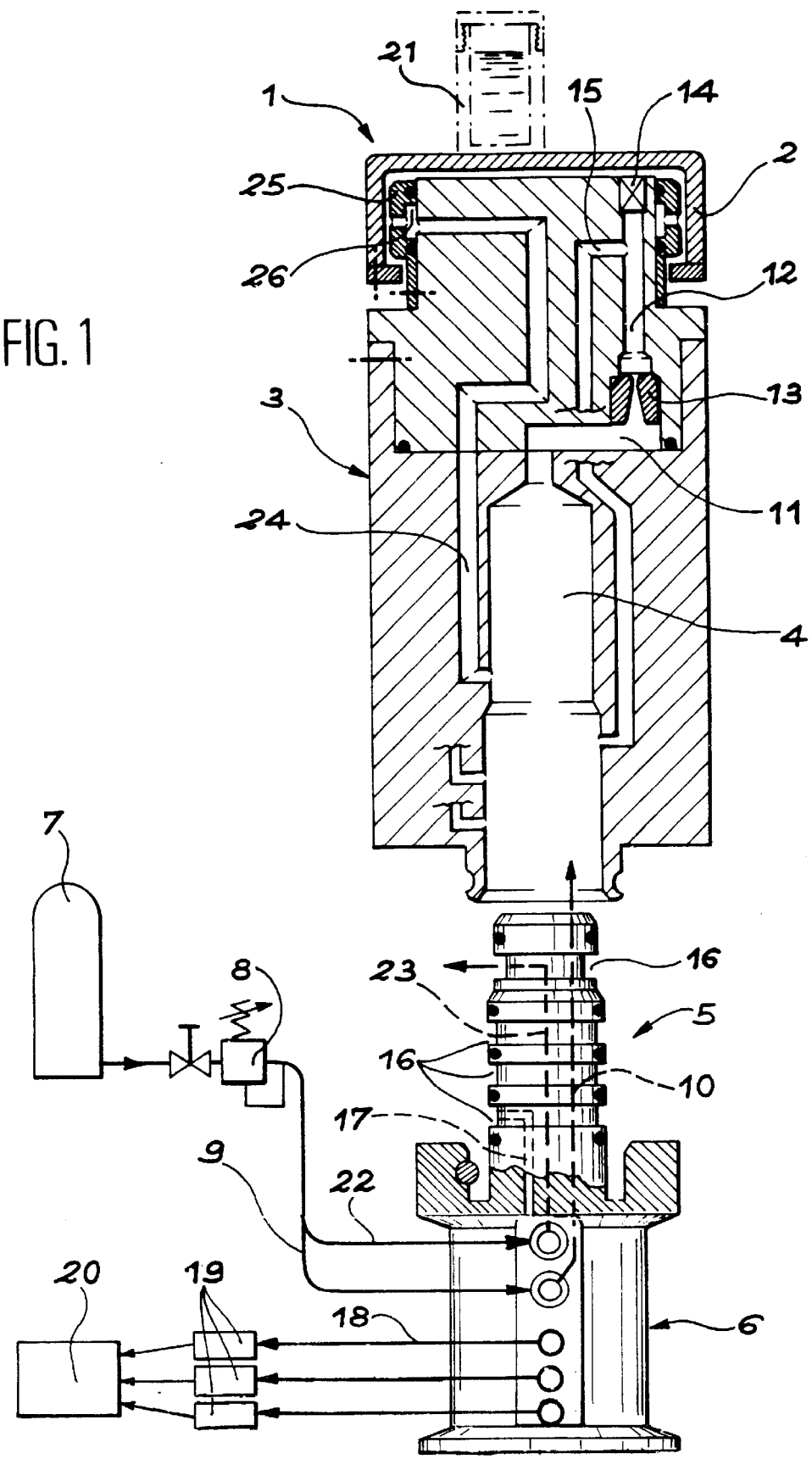
FIG. 1 is a general view of the invention.
Figure 2:
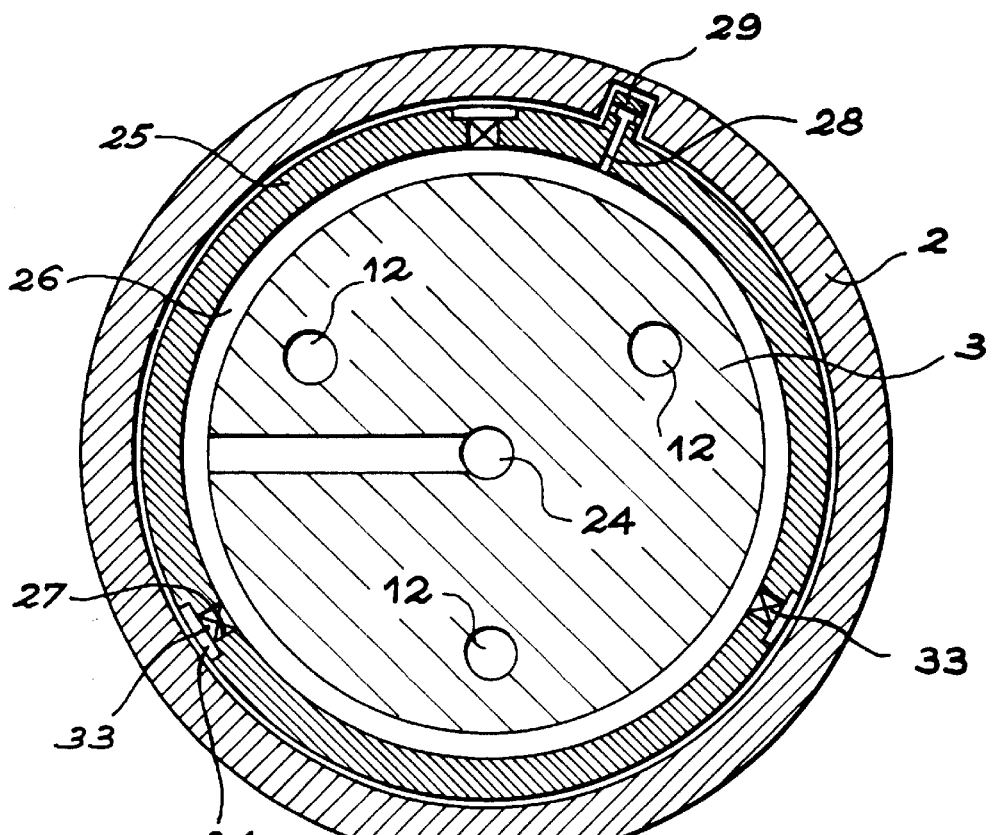
FIG. 2 is a horizontal cross-section of the upper part of the scales.
Figure 3:
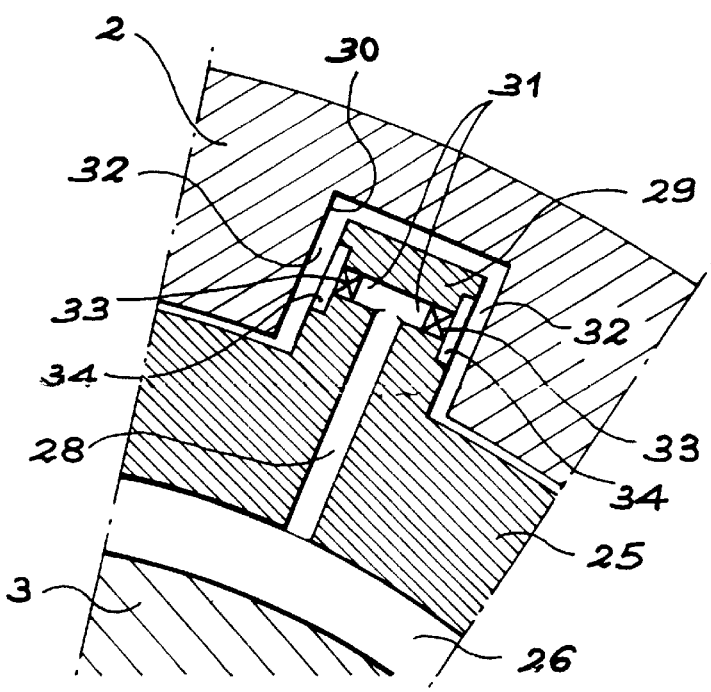

and FIG. 3 is a detail of FIG. 2.

The pneumatic scales are therefore composed of two main components, with no contact during operation: a circular and flat tray 1, fitted on its periphery with a downward flange and a base 3. The tray 1 is placed in non-operating mode on the base 3, and the flange 2 surrounds it. The base 3 is passed through by a certain number of gas blowing pipes necessary for the invention, and its bottom is hollowed out with a chamber 4 into which a pneumatic connector 5 is driven in normal circumstances (it is shown extracted here for reasons of clarity). The base 6 of the pneumatic connector 5 always remains exposed however and receives the gas pipelines leading to the feed and measurement apparatus. There is thus a compressed gas source 7, fitted with a regulator 8 to produce a constant pressure of gas, and one output pipeline 9 of which leads to a central bore 10 in the connector 5, which emerges in the bottom of the chamber 4 and extends by a distribution network 11 leading to vertical pipes 12, here numbering three and arranged in an equilateral triangle in the apex of the base 3, until emerging under the tray 1. Each of the vertical pipes 12 includes an input jet 13 and an output chamber 14. The chamber 14 is a nozzle designed to provide the levitation of the tray 1, i.e. to form a gas cushion. A pressure inlet pipe 15 emerges in each of the vertical pipes 12 between the jet 13 and the chamber 14; it extends through the base 3 to a respective neck 16 of the connector 5, then communicates to a pipe 17 provided through the connector 5 and an external pipeline 18 leading to a pressure sensor 19. The pressure measured by each of the sensors 19 is transmitted to an electronic calculator 20 which adds up these pressure measurements.

The pressure prevailing in the vertical pipes 12 depends in fact on the total weight of the tray 1 and of an object 21 to be weighed which is laid upon it. A preliminary calibration having been undertaken prior to actually using the device, the pressure difference measured by the sensors 19 may be correlated directly with the weight of the object 21. The object 21 may typically be a small hermetically sealed jug containing dangerous liquid and which is put onto the tray 1 by a not shown manipulator apparatus before being picked up again to be taken to a measurement, packaging or other installation, depending on the industry in which the scales are being used. The separation of the tray 1 and the base 3 makes it possible to withstand the manipulator placing the object 21 while knocking against the tray 1 or on the contrary dropping it from a certain height without causing damage, and measurement is not appreciably affected if the object 1 is laid away from the centre of the tray 1 since the pressure prevailing in each cushion 14 is representative of the load it supports.

In the event of the object to be weighed being outside the triangle formed by the three cushions 14, the tray tips, supporting itself on the cushion or cushions 14 nearest the object to be weighed. The cushion or cushions 14 located on the opposite side then give a negative weight. The sum of the whole still gives the weight of the object to be weighed but with less accuracy.

Another external pipeline 22, coming from the gas source 7, leads to the connector 5, in a pipe 23 hollowed out in it, and from there to a final neck 16 connecting to a pipe 24 hollowed out in the base 3. The pipe 24 ends facing a collar 25 set at the apex of the base 3 and which is surrounded by the flange 2 with a slight clearance; it includes a neck 26 on its inner face, in which the pipe 24 emerges. Three lateral 120° pipes 27 pass radially through the collar 25 from the neck 26 and make it possible to feed three jets with air. The three air cushions thus created on the inner flange of the tray 1 make it possible to centre it without friction on its base 3. Moreover, an additional bore 28 extends in the same way to a vertical pin 29 of the collar 25, which extends in a groove 30 corresponding in shape to the flange 2, yet wider than the pin 29 so as to leave sufficient clearance 32 on either side of it. The pipe 28 forks into two opposite branches 31 which each feed gas to a jet 33 emerging in a chamber 34 allowing a gas cushion to be created between the pin 29 and the groove 30 of the tray 1; this arrangement locks the tray 1 against rotation without friction with the body 3.

It may be noted that the great structural simplicity of these scales allow them to be cleaned and decontaminated without concern for their integrity and with great ease; all that is required when necessary is for the tray 1 to be removed for access to be gained to all its faces, although there is no reason why impurities should get under the tray 1 given the protection offered by the flange 2 and the permanent flow of gas.

What is claimed is:

1. A pneumatic weighing device, including a base (3) on which is placed a tray (1) with a flange (2) surrounding the base (3), a system for blowing gas at a set pressure finishing in pipes (12, 24) passing through the base, one at least of the pipes (12) being vertical and emerging under the tray (1), others of the pipes (27) being lateral, divergent and emerging facing the flange, a gas cushion being formed between the base and the tray by the pressure of the blown gas, the device further including a measurement means (19, 20) of a magnitude correlated with the weight of an object (21) laid on the tray.

2. A pneumatic weighing device according to claim 1, wherein the magnitude measured is a pressure prevailing in the vertical pipe (12).

3. A pneumatic weighing device according to claim 2, including two or more other vertical pipes (12) emerging under the tray, the vertical pipes emerging in places corresponding to the apexes of a regular polygon.

4. A pneumatic weighing device according to claim 3, including pressure inlet bores (15) leading to the vertical pipes (12), the measurement means consisting of pressure sensors in association respectively with the bores and with the vertical pipes, and a calculation means adding up the measurements.

5. A pneumatic weighing device according to claim 1, including three lateral pipes (12), the tray (1) and the flange (2) being circular.

6. A pneumatic weighing device according to claim 5, wherein the lateral pipes (27) are hollowed out through a collar (25) and emerge in a gas distribution neck (26) hollowed out in an inner face of the collar.

7. A pneumatic weighing device according to claim 1, wherein the base, the tray and the flange are circular, except for a place where the base (3) and the flange (2) are shaped into a vertical groove (30) and a pin (27) engaged in the groove leaving two clearances (32) facing opposite lateral sides of the pin, and the gas blowing system also includes two lateral pipes (31) ending respectively in the clearances and oriented in opposite directions.

* * * * *

UNITED STATES PATENT AND TRADEMARK OFFICE
CERTIFICATE OF CORRECTION

PATENT NO. : 6,504,113 B2
DATED : January 7, 2003
INVENTOR(S) : Paul Gallard et al.

It is certified that error appears in the above-identified patent and that said Letters Patent is hereby corrected as shown below:

<u>Column 2,</u>
Line 26, please delete "dr".
Line 27, please delete "Preferred", and insert therefor -- preferred --.
Line 36, please delete "flange", and insert therefor -- flange 2, --.

Signed and Sealed this

Twentieth Day of May, 2003

JAMES E. ROGAN
*Director of the United States Patent and Trademark Office*